(12) United States Patent
Luo et al.

(10) Patent No.: US 12,050,380 B2
(45) Date of Patent: Jul. 30, 2024

(54) DISPLAY PANEL COMPRISING A PIEZOELECTRIC ELEMENT HAVING ONE END IN CONTACT WITH AN CONNECTED TO A FIRST PRIMARY SPACER AND THE OTHER END IN CONTACT WITH AND CONNECTED TO A SECOND PRIMARY SPACER

(71) Applicant: HKC Corporation Limited, Guangdong (CN)

(72) Inventors: Ni Luo, Guangdong (CN); Weishi Yang, Guangdong (CN); Jianying Zhang, Guangdong (CN); Baohong Kang, Guangdong (CN)

(73) Assignee: HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 18/218,826

(22) Filed: Jul. 6, 2023

(65) Prior Publication Data

US 2024/0142815 A1     May 2, 2024

(30) Foreign Application Priority Data

Oct. 26, 2022 (CN) .......................... 202211320961.1

(51) Int. Cl.
G02F 1/1333 (2006.01)
G02F 1/1339 (2006.01)
G02F 1/139 (2006.01)

(52) U.S. Cl.
CPC .... *G02F 1/133394* (2021.01); *G02F 1/13396* (2021.01); *G02F 1/139* (2013.01)

(58) Field of Classification Search
CPC . G02F 1/133394; G02F 1/139; G06F 3/04146
See application file for complete search history.

(56) References Cited

U.S. PATENT DOCUMENTS 9,715,294 B2 * 7/2017 Zhang ................ G06F 3/04144
2015/0261367 A1 * 9/2015 Zhang ............... G02F 1/136286
438/587

(Continued)

FOREIGN PATENT DOCUMENTS

CN      102707504 A     10/2012
CN      103455202 A  * 12/2013   ......... G02F 1/13338

(Continued)

OTHER PUBLICATIONS

Chinese First Office Action dated Dec. 15, 2022 issued in CN Application No. 202211320961.1.

*Primary Examiner* — Paul C Lee
(74) *Attorney, Agent, or Firm* — Scully, Scott, Murphy & Presser, P.C.

(57) ABSTRACT

A display panel is provided. The display panel includes a first substrate, a second substrate, and a liquid crystal layer. The liquid crystal layer includes multiple liquid crystal molecules. The display panel includes multiple primary spacer assemblies, and each of the multiple the primary spacer assemblies includes a first primary spacer, a second primary spacer, and a piezoelectric element. The first primary spacer is adjacent to the second primary spacer, and two opposite ends of the piezoelectric element are respectively connected to the first primary spacer and the second primary spacer.

15 Claims, 5 Drawing Sheets

(56) References Cited

U.S. PATENT DOCUMENTS

2019/0162993 A1* 5/2019 Hong ................ G02F 1/133707
2022/0018996 A1   1/2022 Hirosawa

FOREIGN PATENT DOCUMENTS

| CN | 105974637 | A | * | 9/2016 | ......... G02F 1/13338 |
| CN | 106951126 | A | | 7/2017 | |
| CN | 111381724 | A | | 7/2020 | |
| JP | H11271712 | A | | 10/1999 | |
| JP | 2014177099 | A | | 9/2014 | |
| JP | 2020166170 | A | | 10/2020 | |

* cited by examiner

FORM MULTIPLE FIRST COLUMNS, MULTIPLE SECOND COLUMNS, AND THE MULTIPLE SECONDARY SPACERS ON SAID ONE SIDE OF THE FIRST SUBSTRATE, WHERE THE MULTIPLE FIRST COLUMNS EACH IS ADJACENT TO A SECOND COLUMN, THE MULTIPLE FIRST COLUMNS EACH DEFINE A FIRST GROOVE ON ONE SIDE OF THE FIRST COLUMN FACING THE SECOND COLUMN AND DEFINE A SECOND GROOVE AT A BOTTOM OF THE FIRST GROOVE, THE MULTIPLE SECOND COLUMNS EACH DEFINE A THIRD GROOVE ON ONE SIDE OF THE SECOND COLUMN FACING THE FIRST COLUMN AND DEFINES A FOURTH GROOVE AT A BOTTOM OF THE THIRD GROOVE — S20a

FORM A FIRST FIXING ELEMENT IN THE SECOND GROOVE AND A SECOND FIXING ELEMENT IN THE FOURTH GROOVE, FORM THE PIEZOELECTRIC ELEMENT BETWEEN THE FIRST FIXING ELEMENT AND THE SECOND FIXING ELEMENT, WHERE ONE END OF THE PIEZOELECTRIC ELEMENT IS CONNECTED TO THE FIRST FIXING ELEMENT AND IN THE FIRST GROOVE, AND THE OTHER END OF THE PIEZOELECTRIC ELEMENT IS CONNECTED TO THE SECOND FIXING ELEMENT AND IN THE THIRD GROOVE — S20b

FORM A THIRD COLUMN ON ONE SIDE OF THE FIRST COLUMN AWAY FROM THE FIRST SUBSTRATE, AND FORM A FOURTH COLUMN ON ONE SIDE OF THE SECOND COLUMN AWAY FROM THE FIRST SUBSTRATE, WHERE THE FIRST COLUMN AND THE THIRD COLUMN FORM THE FIRST PRIMARY SPACER, AND THE SECOND COLUMN AND THE FOURTH COLUMN FORM THE SECOND PRIMARY SPACER — S20c

FIG. 10

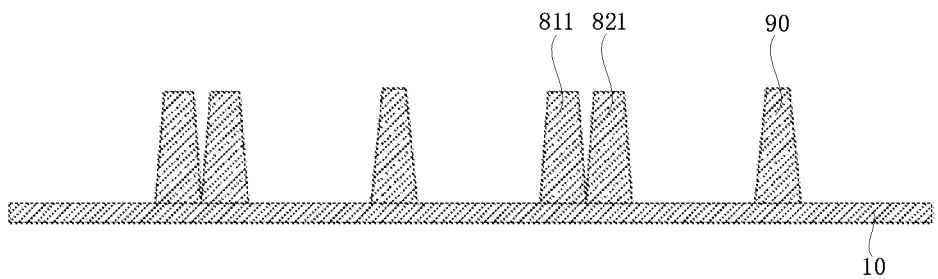

FIG. 11

DISPLAY PANEL COMPRISING A
PIEZOELECTRIC ELEMENT HAVING ONE
END IN CONTACT WITH AN CONNECTED
TO A FIRST PRIMARY SPACER AND THE
OTHER END IN CONTACT WITH AND
CONNECTED TO A SECOND PRIMARY
SPACER

CROSS-REFERENCE TO RELATED
APPLICATIONS

This application claims priority under 35 U.S.C. § 119(a) to Chinese Patent Application No. 202211320961.1, filed Oct. 26, 2022, the entire disclosure of which is incorporated herein by reference.

TECHNICAL FIELD

This disclosure relates to field of display technology, and in particular, to a display panel, a method for manufacturing the display panel, and a display device having the display panel.

BACKGROUND

A liquid crystal display device (LCD) generally includes a LCD panel and a backlight module. The LCD panel is mainly composed of a color substrate, an array substrate and liquid crystal molecules between the color substrate and the array substrate. Meanwhile, a post spacer (PS) is also disposed between the color substrate and the array substrate, and the PS is mainly used for maintaining a gap between the color substrate and the array substrate.

After a surface of the LCD is scratched by a rigid component, a scratching trace of about 5 s will appear on the LCD along a scribing path, that is, a trace mura will appear on the LCD along the scribing path. The main reason for the trace mura is that scratching may cause the spacer corresponding to a scratched region to be deflected or deformed, causing pre-tilt angles of liquid crystal molecules around the spacer to change, so that under the same preset electric field, a deflection angle of the liquid crystal molecules corresponding to the scratched region is greater than a deflection angle of the liquid crystal molecules corresponding to other display regions. In the related art, an electric-field intensity of the preset electric field formed by a pixel electrode and a common electrode connected to a common voltage (Vcom) is reduced by reducing the potential of the γ voltage connected to the pixel electrode, so as to solve the problem of trace mura caused by scratching. However, the transmittance of the display panel will be reduced in this manner, which may also bring poor visual experience to the user.

Therefore, how to solve the problem of trace mura of the display panel caused by scratching while not reducing the transmittance of the display panel is an urgent problem to be solved by those of ordinary skill in the art.

SUMMARY

A display panel is provided in implementations of the present disclosure. The display panel includes a first substrate, a second substrate opposite to the first substrate, and a liquid crystal layer between the first substrate and the second substrate. The liquid crystal layer includes multiple liquid crystal molecules. The display panel further includes multiple primary spacer assemblies, and each of the multiple primary spacer assemblies includes a first primary spacer and a second primary spacer adjacent to the first primary spacer. One end of the first primary spacer is connected to the first substrate, and the other end of the first primary spacer is in contact with the second substrate, one end of the second primary spacer is connected to the first substrate, and the other end of the second primary spacer is in contact with the second substrate. Each of the multiple primary spacer assemblies further includes a piezoelectric element, one end of the piezoelectric element is connected to the first primary spacer, and the other end of the piezoelectric element is connected to the second primary spacer. When the first primary spacer and the second primary spacer are deformed and/or deflected, the piezoelectric element is deformed to generate a compensation electric field, and the compensation electric field is used to reduce an intensity of a preset electric field for driving the liquid crystal molecules to deflect.

A display device is further provided in implementations of the present disclosure. The display device includes a backlight module and the above display panel. The display panel is disposed at a light-emitting side of the backlight module.

A method for manufacturing a display panel is further provided in implementations of the present disclosure, which is used for manufacturing the described display panel. The method for manufacturing the display panel includes the following. A first substrate is provided. Multiple primary spacer assemblies and multiple secondary spacers are formed on one side of the first substrate, where each of the plurality of primary spacer assemblies includes a first primary spacer, a second primary spacer, and a piezoelectric element, the first primary spacer and the second primary spacer are adjacent to each other and are connected to the first substrate, one end of the piezoelectric element is connected to the first primary spacer, and the other end of the piezoelectric element is connected to the second primary spacer. A second substrate is provided, and the first substrate and the second substrate are cell-aligned to form the display panel, where the first primary spacer, the second primary spacer, and the multiple secondary spacers are between the first substrate and the second substrate.

BRIEF DESCRIPTION OF THE DRAWINGS

To explain technical solutions in implementations of the present disclosure more clearly, the following will give a brief introduction to accompanying drawings which are needed to be used in description of implementations. Apparently, the accompanying drawings in the following description are some implementations of the present disclosure. For those of ordinary skill in the art, other accompanying drawings can be obtained according to these accompanying drawings without creative efforts.

FIG. 10 is a second flowchart of the operations at S20 in the method for manufacturing the display panel as illustrated in FIG. 8.

FIG. 11 is a schematic diagram of a structure formed through operations at S20a in the method for manufacturing a display panel as illustrated in FIG. 8.

DETAILED DESCRIPTION

Figure 1:
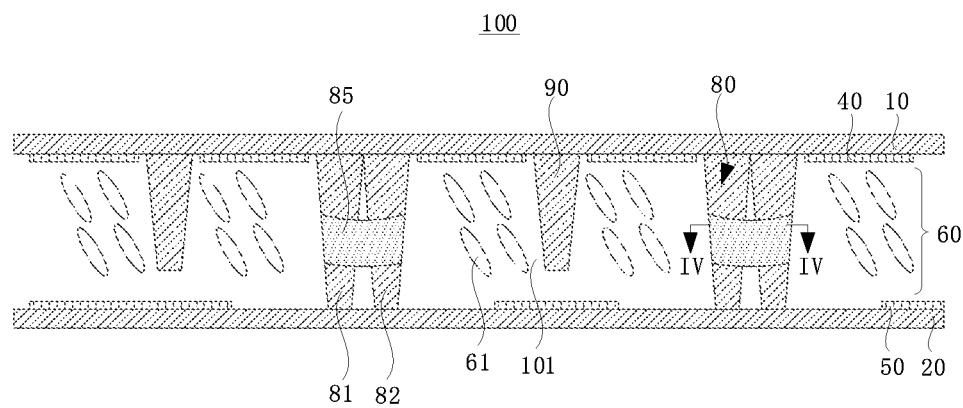
FIG. 1 is a schematic diagram of a first layered-structure of a display panel provided in an implementation of the present disclosure.

To facilitate understanding of the present disclosure, a comprehensive description will be given below with reference to related accompanying drawings. The accompanying drawings illustrate some exemplary implementations of the present disclosure. However, the present disclosure can be implemented in many different forms and is not limited to implementations described herein. On the contrary, these implementations are provided for a more thorough and comprehensive understanding of the present disclosure.

The following implementations are described with reference to accompanying drawings to illustrate particular implementations in which the present disclosure may be implemented. The serial numbers assigned herein for the components themselves, such as "first", "second", etc., are only used to distinguish between objects described and do not have any sequential or technical meaning. The "connection" and "coupling" in the present disclosure, unless otherwise specified, include direct and indirect connection (coupling). Direction terms mentioned in the present disclosure, such as "up", "down", "front", "back", "left", "right", "inside", "outside", "side surface", etc., are only directions with reference to the directions of the accompanying drawings. Therefore, the direction terms are used for better and clearer illustration and understanding of the present disclosure, and are not intended to indicate or imply that the device or component must have a specific orientation, be constructed and operated in the particular orientation, and therefore cannot be construed as limiting to the present disclosure.

In the description of the present disclosure, it should be noted that unless otherwise expressly specified or defined, terms such as "disposed", "arranged", "provided with", "mount", "couple", and "connect" should be understood broadly, and for example, a fixed connection, or a detachable connection, or an integrated connection; may be a mechanical connection; and may be a direct connection, or an indirect connection via an intermediate medium, or may be an internal communication between two components. The specific meanings of the above-mentioned terms in the present disclosure could be understood by those of ordinary skill in the art according to specific situations. It should be noted that the terms "first", "second", etc. in the specification, claims and accompanying drawings of the present disclosure are used to distinguish different objects, rather than to describe a specific order. In addition, terms "comprise", "may comprise", "include", or "may include" used in the present disclosure indicate the existence of corresponding functions, operations, components, etc., which are disclosed, and do not limit one or more other functions, operations, components, etc. Moreover, the terms "comprise" or "include" indicate the existence of corresponding features, numbers, steps, operations, elements, components, or combinations thereof disclosed in the specification, and do not exclude the existence or addition of one or more other features, numbers, steps, operations, elements, components, or combinations thereof, with the intent of covering non-exclusive inclusion. It is also to be understood that as described herein, "at least one" means one and more than one, e.g., one, two, three, etc., while "multiple" or "a plurality of" means at least two, e.g., two or three, etc., unless otherwise specifically defined. The terms "step 1", "step 2", etc., in the description, claims, and the accompanying drawings of the present disclosure are used to distinguishing different objects, rather than to describe a specific order.

Unless otherwise defined, all technical and scientific terms used herein have the same meaning as commonly understood by those skilled in the art of the present disclosure. The terms used herein in the specification of the present disclosure are for the purpose of describing specific implementations only and are not intended to limit the present disclosure.

Reference is made to FIG. 1, which is a schematic diagram of a first layered-structure of a display panel provided in an implementation of the present disclosure. The display panel 100 provided in the implementation of the present disclosure may include at least a first substrate 10, a second substrate 20, a first alignment layer 40, a second alignment layer 50, and a liquid crystal layer 60. The first substrate 10 and the second substrate 20 are disposed opposite to each other and spaced apart from each other in parallel. The first alignment layer 40 is disposed on one side of the first substrate 10 facing the second substrate 20, and the second alignment layer 50 is disposed on one side of the second substrate 20 facing the first substrate 10. In other words, the first alignment layer 40 and the second alignment layer 50 are disposed opposite to each other and spaced apart from each other in parallel, and the liquid crystal layer 60 is disposed between the first alignment layer 40 and the second alignment layer 50, and the liquid crystal layer 60 includes multiple liquid crystal molecules 61.

It should be understood that, orientations of the multiple liquid crystal molecules 61 drop-filled between the first substrate 10 and the second substrate 20 are disordered, and in order to realize normal display of the display panel 100, the multiple liquid crystal molecules 61 should be arranged according to corresponding rules. Therefore, the first alignment layer 40 is formed on one side of the first substrate 10 facing the second substrate 20, the second alignment layer 50 is formed on one side of the second substrate 20 facing the first substrate 10, and the first alignment layer 40 and the second alignment layer 50 enable the multiple liquid crystal molecules 61 to be arranged according to corresponding pre-tilt angles, thereby achieving normal display of the display panel 100.

In an implementation, the first substrate 10 may be a color substrate, and the second substrate 20 may be an array substrate; or, the first substrate 10 may be an array substrate, and the second substrate 20 may be a color substrate, which is not specifically limited in the present disclosure. The first alignment layer 40 and the second alignment layer 50 each may be made of one or more materials selected from a group consisting of polystyrene (PS) and polyimide (PI), which is not specifically limited in the present disclosure.

In the implementation of the present disclosure, please refer to FIG. 1, the display panel 100 can further include multiple primary spacer assemblies 80 and multiple secondary spacers 90 disposed between the first substrate 10 and the second substrate 20, and the multiple primary spacer assemblies 80 and the multiple secondary spacers 90 are disposed in the same layer. The multiple primary spacer assemblies 80 and the multiple secondary spacers 90 are alternately arranged at intervals in sequence, that is, one secondary spacer 90 is disposed between every two adjacent primary spacer assemblies 80, and correspondingly, one primary spacer assembly 80 is disposed between every two adjacent secondary spacers 90.

In an implementation, one end of the primary spacer assembly 80 is connected to the first substrate 10, and the other end of the primary spacer assembly 80 is in contact with the second substrate 20. One end of the secondary spacer 90 is connected to the first substrate 10, and the other end of the secondary spacer 90 is spaced apart from the second substrate 20. In other words, the primary spacer assembly 80 has a thickness greater than that of the secondary spacer 90. A liquid-crystal dropping space 101 is defined between the first substrate 10, the second substrate 20, the multiple primary spacer assemblies 80, and the multiple secondary spacers 90, and the multiple liquid crystal molecules 61 are dropped in the liquid-crystal dropping space 101.

In an implementation, no first alignment layer 40 is disposed where the primary spacer assembly 80 is connected to the first substrate 10, and no first alignment layer 40 is disposed where the secondary spacer 90 is connected to the first substrate 10, that is, the first alignment layer 40 is disposed between the multiple primary spacer assemblies 80 and the multiple secondary spacers 90. No second alignment layer 50 is disposed where the primary spacer assembly 80 is in contact with the second substrate 20, that is, the second alignment layer 50 is disposed between the multiple primary spacer assemblies 80.

It should be understood that, when at least one of the first substrate 10 or the second substrate 20 is subject to an external force load towards each other, the secondary spacer 90 with a smaller height can also function as a support, and such deformation will not affect the primary spacer assemblies 80 and the secondary spacers 90 at other positions, thereby avoiding non-uniform display.

In the implementation of the present disclosure, each of the primary spacer assemblies 80 includes a first primary spacer 81 and a second primary spacer 82 adjacent to the first primary spacer 81. One end of the first primary spacer 81 is connected to the first substrate 10, and the other end of the first primary spacer 81 is in contact with the second substrate 20; and one end of the second primary spacer 82 is connected to the first substrate 10, and the other end of the second primary spacer 82 is in contact with the second substrate 20. That is, the first primary spacer 81 and the second primary spacer 82 are disposed between the first substrate 10 and the second substrate 20. Each of the primary spacer assemblies 80 further includes a piezoelectric element 85, and two opposite ends of the piezoelectric element 85 are connected to the first primary spacer 81 and the second primary spacer 82, respectively. Exemplarily, it should be noted that, the two opposite ends of the piezoelectric element 85 refer to a left end and a right end of the piezoelectric element 85 as illustrated in FIG. 1.

Figure 2:
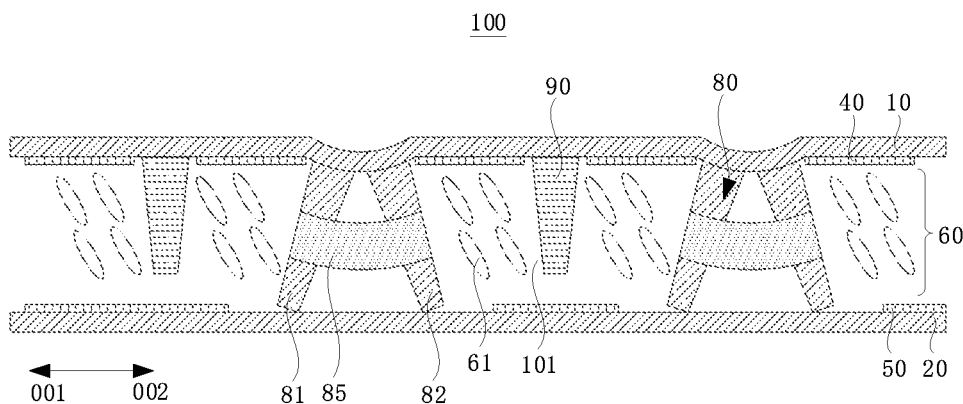
FIG. 2 is a schematic structural diagram of the display panel as illustrated in FIG. 1 in a state of being pressed by an external force.

Reference is made to FIG. 2, which is a schematic structural diagram of the display panel as illustrated in FIG. 1 in a state of being pressed by an external force. When the first primary spacer 81 and the second primary spacer 82 are deformed and/or deflected under the effect of external force extrusion (scratching), the piezoelectric element 85 is deformed to generate a compensation electric field, and the compensation electric field is used to reduce the intensity of a preset electric field for driving the liquid crystal molecules 61 to deflect.

It can be understood that part of the first substrate 10 that is scratched may be recessed, so that the first primary spacer 81 and the second primary spacer 82 are deformed. When the first substrate 10 is recessed to a certain degree, the first primary spacer 81 and the second primary spacer 82 each may be deflected outwards, that is, one end of the first primary spacer 81 close to the second substrate 20 and one end of the second primary spacer 82 close to the second substrate 20 will move away from each other on the second substrate 20, so that the first primary spacer 81 and the second primary spacer 82 each are deflected and inclined. During deformation and deflection of the first primary spacer 81 and the second primary spacer 82, the piezoelectric element 85 is deformed. The piezoelectric element 85 is made of a piezoelectric material, and a positive piezoelectric effect occurs during deformation. Positive and negative charges are generated at one end of the piezoelectric element 85 connected to the first primary spacer 81 and the other end of the piezoelectric element 85 connected to the second primary spacer 82, thereby forming the compensation electric field.

It can be also understood that, when the first primary spacer 81 and the second primary spacer 82 are deformed, pre-tilt angles of liquid crystal molecules 61 around the first primary spacer 81 and the second primary spacer 82 are increased. Therefore, under the action of the same preset electric field, deflection angles of the liquid crystal molecules 61 around the first primary spacer 81 and the second primary spacer 82 are greater than deflection angles of liquid crystal molecules 61 in other display regions. The compensation electric field reduces the intensity of the pre-set electric field around the first primary spacer 81 and the second primary spacer 82, so that the intensity of the pre-set electric field around the first primary spacer 81 and the second primary spacer 82 is less than the intensity of the pre-set electric field in other display regions, and thus the deflection angles of the liquid crystal molecules 61 around the first primary spacers 81 and the second primary spacers 82 are consistent with the deflection angles of the liquid crystal molecules 61 in other display regions.

In an implementation, the first primary spacer 81 and the second primary spacer 82 each being deflected outwards refers to that for the first primary spacer 81 and the second primary spacer 82 adjacent to each other, one end of the first primary spacer 81 close to the second substrate 20 and one end of the second primary spacer 82 close to the second substrate 20 is away from each other.

In an implementation, the display panel 100 may be a twisted nematic (TN) display panel, a vertical alignment (VA) display panel, an in-plane switching (IPS) display panel, or a fringe field switching (FFS) display panel, which is not specifically limited in the present disclosure.

In an implementation, the piezoelectric element 85 may be made of one or more materials selected from a group consisting of fine-grained piezoelectric ceramic, lead titanate (PbTiO3) based piezoelectric ceramic, piezoelectric composite materials, a multi-element single crystal piezoelectrics, and the like, which is not specifically limited in the present disclosure.

In an implementation, the piezoelectric element 85 may have a sheet structure as a whole, and one end of the piezoelectric element 85 may be connected to an intermediate part of the first primary spacer 81 and the other end of the piezoelectric element 85 may be connected to an intermediate part of the second primary spacer 82, so that the piezoelectric element 85 may sensitively sense deformation and/or deflection of the first primary spacer 81 and deformation and/or deflection of the second primary spacer 82. Due to the piezoelectric effect, when the first substrate 10 is deformed by being pressed by an external force, the first primary spacer 81 and the second primary spacer 82 are deformed, and thus the piezoelectric element 85 is deformed. Positive and negative charges are generated on two opposite ends of the piezoelectric element 85, the compensation electric field is formed, and the built-in compensation electric field can weaken the intensity of an original electric field at the pressed position to improve a disturbance condition of liquid crystal molecules.

In exemplary implementations, the heights of two opposite ends of the piezoelectric element 85 may be the same or different. That is, the height of a connection between the piezoelectric element 85 and the first primary spacer 81 is greater than, equal to, or less than the height of a connection between the piezoelectric element 85 and the second primary spacer 82.

In summary, the display panel 100 provided in implementations of the present disclosure includes the first substrate 10, the second substrate 20 opposite to the first substrate 10, and liquid crystal molecules 61 between the first substrate 10 and the second substrate 20. The display panel 100 includes multiple primary spacer assemblies 80, and the multiple primary spacer assemblies 80 each include the first primary spacer 81 and the second primary spacer 82 adjacent to the first primary spacer 81. One end of the first primary spacer 81 is connected to the first substrate 10, and the other end of the first primary spacer 81 is in contact with the second substrate 20. One end of the second primary spacer 82 is connected to the first substrate 10, and the other end of the second primary spacer 82 is in contact with the second substrate 20. The multiple primary spacer assemblies 80 each further includes a piezoelectric element 85, and two opposite ends of the piezoelectric element 85 are connected to the first primary spacer 81 and the second primary spacer 82, respectively. When the first primary spacer 81 and the second primary spacer 82 are deformed and/or deflected, the piezoelectric element 85 is deformed to generate the compensation electric field, and the compensation electric field is used to reduce the intensity of the preset electric field for driving the liquid crystal molecules 61 to deflect. Therefore, when the display panel 100 is scratched, the compensation electric field that reduces the preset electric field is formed in the scratched region to compensate for the difference between pre-tilt angles of the liquid crystal molecules 61 in the scratched region and pre-tilt angles of the liquid crystal molecules 61 in other display regions, thereby preventing trace mura in the scratched region. Furthermore, the compensation electric field does not reduce the transmittance of the display panel 100, thereby improving the visual experience of the user.

Figure 3:
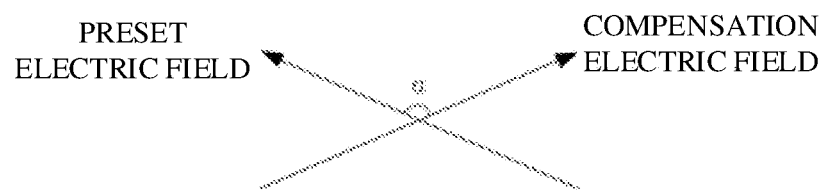
FIG. 3 is a schematic diagram of an angle between a compensation electric field and a preset electric field provided in an implementation of the present disclosure.

Reference is made to FIG. 3, which is a schematic diagram of an angle between a compensation electric field and a preset electric field provided in an implementation of the present disclosure. In an implementation of the present disclosure, an angle $\alpha$ between an electric-field direction of the compensation electric field and an electric-field direction of the preset electric field is greater than 90° and smaller than or equal to 180°. For example, 91°, 100°, 120°, 135°, 150°, 170°, 180°, or other values, which is not specifically limited in the present disclosure. When the angle between the compensation electric field and the preset electric field is 180°, the direction of the compensation electric field is opposite to that of the preset electric field. It can be understood that, the compensation electric field at least has a component opposite to the electric-field direction of the preset electric field, so that the electric-field intensity of the preset electric field can be reduced by the compensation electric field.

It should be understood that, please refer to FIG. 2, when the display panel 100 is a TN display panel or a VA display panel, if the electric-field direction of the preset electric field is from the second substrate 20 to the first substrate 10, the compensation electric field has at least a component from electric field intensity to the second substrate 20. When the display panel 100 is an IPS display panel or an FFS display panel, if the electric-field direction of the preset electric field is a first direction 001, the compensation electric field has at least a component of a second direction 002, where the first direction 001 is opposite to the second direction 002.

In an implementation of the present disclosure, the thickness of each of the first primary spacer 81 and the second primary spacer 82 may range from 2 to 6 μm, for example, 2 μm, 2.5 μm, 3.2 μm, 4 μm, 5 μm, 6 μm, or any other values, which is not specifically limited in the present disclosure.

In an implementation, a deflection angle of each of the first primary spacer 81 and the second primary spacer 82 is less than 40°, that is, an angle between an axis of the first primary spacer 81 after deflection and a normal of the first substrate 10 is less than 40°, and an axis of the second primary spacer 82 after deflection and the normal of the first substrate 10 is less than 40°, for example, 1°, 10°, 15°, 20°, 27°, 35°, 40°, or other values, which is not specifically limited in the present disclosure.

In an implementation, on one side of the first substrate 10, a distance between the first primary spacer 81 and the second primary spacer 82 ranges from 0 to 1 um. In other words, a distance between the end of the first primary spacer 81 close to the first substrate 10 and one end of the second primary spacer 82 close to the first substrate 10 ranges from 0 to 1 μm, such as 0 um, 0.2 um, 0.5 um, 0.8 um, 1 um, or other values, which is not specifically limited in the present disclosure. On one side of the second substrate 20, a distance between the first primary spacer 81 and the second primary spacer 82 may be 1 to 10 μm. In other words, a distance between one end of the first primary spacer 81 close to the second substrate 20 and one end of the second primary spacer 82 close to the second substrate 20 ranges from 1 to 10 μm, for example 1 um, 2.5 um, 3.5 um, 5um, 6 um, 7.5 um, 9 um, 10 um, or other values, which is not specifically limited in the present disclosure.

In an implementation, the thickness of the secondary spacers 90 may range from 1.5 um to 4 um, for example, 1.5 um, 2 um, 2.7 um, 3 um, 3.4 um, 4 um, or other values, which is not specifically limited in the present disclosure. However, it should be noted that the thicknesses of the first primary spacer 81 and the thicknesses of the second primary spacer 82 are both required to be greater than that of the secondary spacer 90.

In an implementation, the first primary spacer 81, the second primary spacer 82, and the secondary spacer 90 each may be of a truncated cone shape. In other implementations of the present disclosure, the first primary spacer 81, the second primary spacer 82, and the secondary spacer 90 each may also be of a truncated pyramid shape, which is not specifically limited in the present disclosure.

Figure 4:
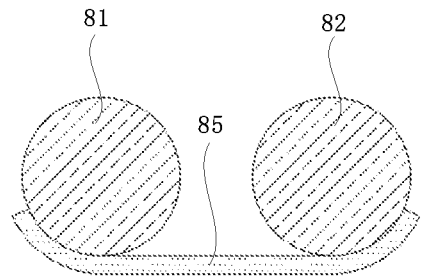
FIG. 4 is a schematic cross-sectional view of the display panel as illustrated in FIG. 1, taken along a direction of IV-IV.

Please refer to FIG. 4, which is a schematic cross-sectional view of the display panel as illustrated in FIG. 1, taken along a direction of IV-IV. In an implementation of the present disclosure, one end of the piezoelectric element 85 is wrapped at least partially around the first primary spacer 81, and the other end of the piezoelectric element 85 is wrapped at least partially around the second primary spacer 82. Further, "partially around" may refer to around a quarter of a periphery, around a half of a periphery, around two thirds of a periphery, around three quarters of a periphery, or the like, which is not specifically limited in the present disclosure. It should be understood that the piezoelectric element 85 can also avoid a deflection angle of each of the first primary spacer 81 and the second primary spacer 82 from being too large, thereby avoiding scratching the second alignment layer 50 on the second substrate 20.

Figure 5:
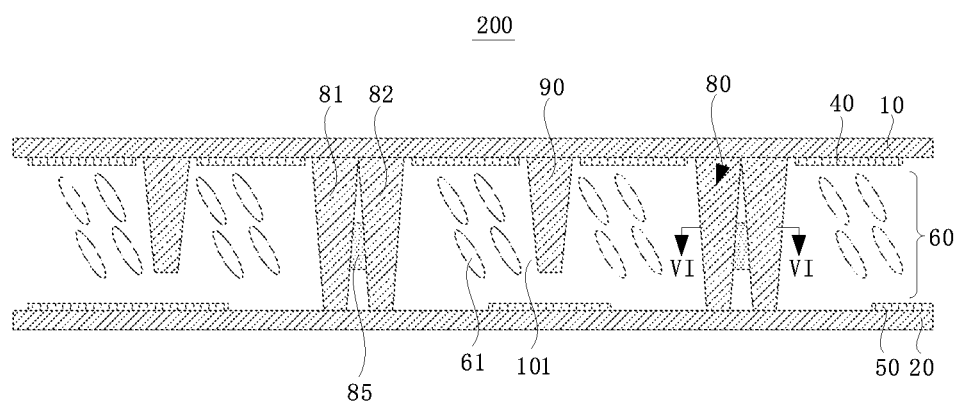
FIG. 5 is a schematic diagram of a second layered-structure of the display panel provided in another implementation of the present disclosure.
Figure 6:
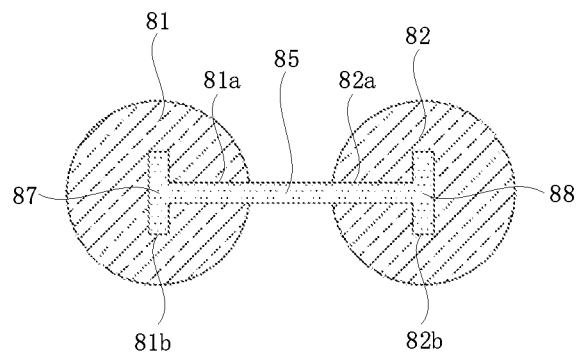
FIG. 6 is a schematic cross-sectional view of the display panel as illustrated in FIG. 5 taken along a direction of VI-VI.

Please refer to FIGS. 5 and 6, where FIG. 5 is a schematic diagram of a second layered-structure of the display panel provided in another implementation of the present disclosure, and FIG. 6 is a schematic cross-sectional view of the display panel as illustrated in FIG. 5 taken along a direction of VI-VI. The difference between the display panel 200 with the second layered-structure and the display panel 100 with the first layered-structure lies in that the opposite ends of the piezoelectric element 85 are connected to the first primary spacers 81 and the second primary spacers 82 respectively in a different way. That is, the piezoelectric element 85 in the display panel 200 with the second layered-structure is partially embedded in the first primary spacer 81 and the second primary spacer 82.

In an implementation of the present disclosure, refer to FIG. 6, the first primary spacer 81 defines a first groove 81*a* at one side of the first primary spacer 81 facing the second primary spacer 82 and defines a second groove 81*b* at a bottom of the first groove 81*a*, and the first groove 81*a* is communicated with the second groove 81 *b*. The second primary spacer 82 defines a third groove 82*a* at one side of the second primary spacer 82 facing the first primary spacer 81 and defines a fourth groove 82*b* at a bottom of the third groove 82*a*, and the third groove 82*a* is communicated with the fourth groove 82*b*. Two opposite ends of the piezoelectric element 85 are respectively accommodated in the first groove 81*a* and the third groove 82 *a*. Exemplarily, it should be noted that, two opposite ends of the piezoelectric element 85 refer to a left end and a right end of the piezoelectric element 85 as illustrated in FIG. 6.

In an implementation, each of the multiple primary spacer assemblies 80 further includes a first fixing element 87 and a second fixing element 88, the first fixing element 87 is accommodated in the second groove 81*b*, the second fixing element 88 is accommodated in the fourth groove 82*b*, and two opposite ends of the piezoelectric element 85 are connected to the first fixing element 87 and the second fixing element 88, respectively. Further, the first fixing element 87, the second fixing element 88, and the piezoelectric element 85 may be integrally formed. It should be appreciated that, through the above solution, the piezoelectric element 85 can sensitively sense the deformation and/or deflection of the first primary spacer 81 and the deformation and/or deflection of the second primary spacer 82, and in addition the amount of the piezoelectric element 85 can also be reduced, so that after the piezoelectric element 85 is deformed, the distance between positive charges and negative charges generated on one end of the piezoelectric element 85 and positive charges and negative charges generated on the other end of the piezoelectric element 85 is shorter. In this way, a range of the compensation electric field is reduced, which is beneficial to improving the intensity of a local preset electric field precisely.

In an implementation, the first fixing element 87 is matched with the second recess 81*b* in shape and size, and the second fixing element 88 is matched with the fourth recess 82*b* in shape and size. It will be appreciated that the first fixing element 87, second fixing element 88, and the piezoelectric element 85 may be made of the same material.

In an implementation, a width of the second groove 81*b* is greater than a width of the first groove 81*a*, and/or a length of the second groove 81*b* is greater than a length of the first groove 81*a*, so as to enhance the connection between the first fixing element 87 accommodated in the second groove 81*b* and the first primary spacer 81, and further enhance the connection between the piezoelectric element 85 and the first primary spacer 81. A width of the fourth groove 82*b* is greater than a width of the third groove 82*a*, and/or a length of the fourth groove 82*b* is greater than a length of the third groove 82*a*, so as to enhance the connection between the second fixing element 88 accommodated in the fourth groove 82*b* and the second primary spacer 82, and further enhance the connection between the piezoelectric element 85 and the second primary spacer 82.

In an implementation, in a cross section along the direction of VI-VI, the first groove 81*a* and an entirety of the second groove 81*b* may be cooperatively in a "T" shape, and the third groove 82*a* and the fourth groove 82*b* may be cooperatively in a "T" shape.

In summary, the display panel 200 provided in implementations of the present disclosure includes the first substrate 10, the second substrate 20 disposed opposite to the first substrate 10, and liquid crystal molecules 61 between the first substrate 10 and the second substrate 20. The display panel 200 includes multiple primary spacer assemblies 80, and each of the multiple primary spacer assemblies 80 includes the first primary spacer 81 and the second primary spacer 82 disposed opposite to the first primary spacer 81. One end of the first primary spacer 81 is connected to the first substrate 10, and the other end of the first primary spacer 81 is in contact with the second substrate 20. One end of the second primary spacer 82 is connected to the first substrate 10, and the other end of the second primary spacer 82 is in contact with the second substrate 20. Each of the multiple primary spacer assemblies 80 further includes the piezoelectric element 85, and two opposite ends of the piezoelectric element 85 are connected to the first primary spacer 81 and the second primary spacer 82, respectively. When the first primary spacer 81 and the second primary spacer 82 are deformed and/or deflected, the piezoelectric element 85 is deformed to generate the compensation electric field, and the compensation electric field is used to reduce the intensity of the preset electric field for driving the liquid crystal molecules 61 to deflect. Therefore, when the display panel 200 is scratched, the compensation electric field that reduces the preset electric field will be generated in the scratched region to compensate for the difference between pre-tilt angles of the liquid crystal molecules 61 in the scratched region and pre-tilt angles of the liquid crystal molecules 61 in other display regions, thereby preventing trace mura in the scratched region. Furthermore, the compensation electric field does not reduce the transmittance of the display panel 200, thereby improving the visual experience of the user.

Figure 7:
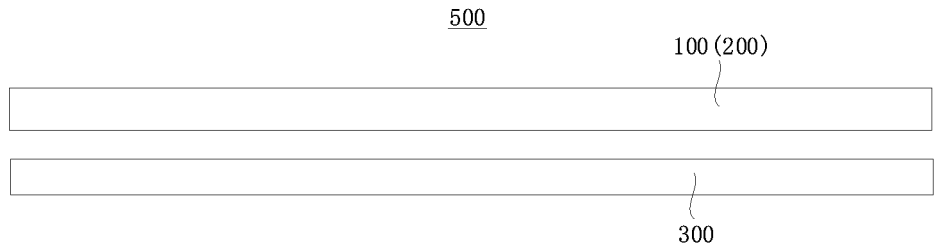
FIG. 7 is a schematic diagram of a layered-structure of a display device provided in another implementation of the present disclosure.

Please refer to FIG. 7, which is a schematic diagram of a layered-structure of a display device provided in another implementation of the present disclosure. Based on the same inventive concept, the display device 500 provided in the implementation of the present disclosure includes a backlight module 300 and the described display panel 100 (200). The display panel 100 (200) is disposed at a light-emitting side of the backlight module 300. The backlight module 300 is configured to serve as a backlight source for the display panel 100 (200), and the display panel 100 (200) is configured for image display. The display panel 100 (200) has been described in detail in implementations as illustrated in FIGS. 1 to 6, which will not be described in detail herein.

It should be understood that, the display device 500 may be used in an electronic device including, but not limited to, a tablet computer, a notebook computer, a desktop computer, and the like. According to implementations of the present disclosure, a specific type of the display device 500 is not particularly limited, and those skilled in the art can make a corresponding design according to specific use requirements of the display device 500, which will not be repeated herein.

In an implementation, the display device 500 further includes other necessary components and assemblies such as a driving board, a power board, a high-voltage board and a button control board. Those skilled in the art can make corresponding supplements on the display device 500 according to the specific type and actual functions of the display device 500, which will not be repeated herein.

In conclusion, the display device 500 provided in implementations of the present disclosure includes the backlight module 300 and the display panel 100 (200). The display panel 100 (200) includes the first substrate 10, the second substrate 20 opposite to the first substrate 10, and liquid crystal molecules 61 between the first substrate 10 and the second substrate 20. The display panel 100 (200) includes multiple primary spacer assemblies 80, and each of the multiple primary spacer assemblies 80 includes the first primary spacer 81 and the second primary spacer 82 adjacent to the first primary spacer 81. One end of the first primary spacer 81 is connected to the first substrate 10, and the other end of the first primary spacer 81 is in contact with the second substrate 20. One end of the second primary spacer 82 is connected to the first substrate 10, and the other end of the second primary spacer 82 is in contact with the second substrate 20. Each of the primary spacer assemblies 80 further includes a piezoelectric element 85, and two opposite ends of the piezoelectric element 85 are connected to the first primary spacer 81 and the second primary spacer 82, respectively. When the first primary spacer 81 and the second primary spacer 82 are deformed and/or deflected, the piezoelectric element 85 is deformed to generate the compensation electric field, and the compensation electric field is used to reduce the intensity of the preset electric field for driving the liquid crystal molecules 61 to deflect. Therefore, when the display panel 100 (200) is scratched, the compensation electric field for reducing the preset electric field will be generated in the scratched region to compensate for the difference between pre-tilt angles of the liquid crystal molecules 61 in the scratched region and pre-tilt angles of the liquid crystal molecules 61 in other display regions, thereby preventing trace mura in the scratched region. Furthermore, the compensation electric field does not reduce the transmittance of the display panel 100 (200), thereby improving the visual experience of the user.

Figure 8:
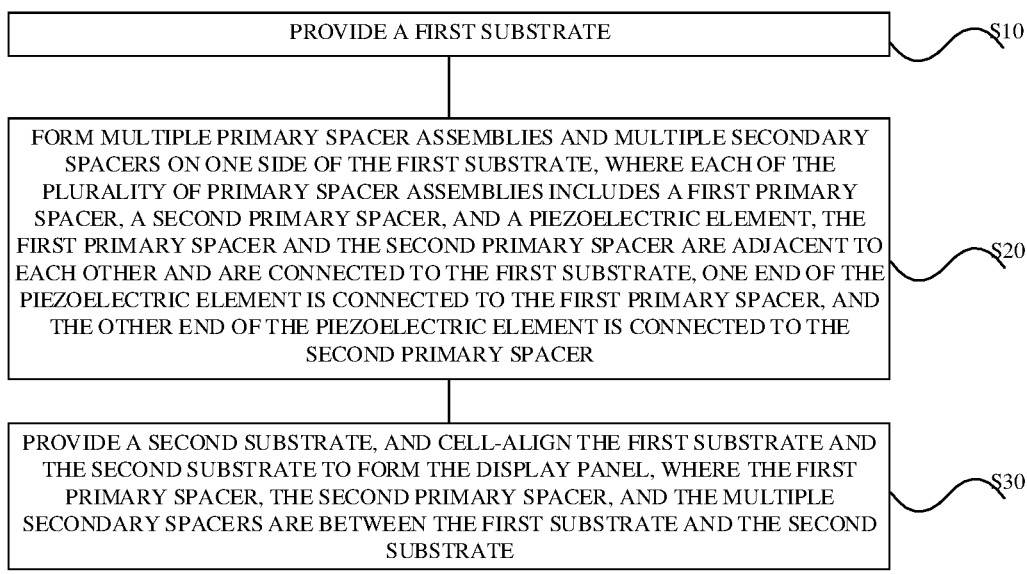
FIG. 8 is a schematic flowchart of a method for manufacturing a display panel provided in an implementation of the present disclosure.

Based on the same inventive concept, a method for manufacturing a display panel, for manufacturing the display panel illustrated in FIGS. 1 to 6 is provided in implementations of the present disclosure. For description of the display panel involved in the method for manufacturing the display panel provided in another implementation of the present disclosure, reference can be made to the related description of the display panel provided in an implementation, which will not be elaborated herein. Please refer to FIG. 8, where FIG. 8 is a schematic flowchart of a method for manufacturing a display panel provided in another implementation of the present disclosure. The method for manufacturing a display panel at least includes the following.

At S10, a first substrate 10 is provided.

At S20, multiple primary spacer assemblies 80 and multiple secondary spacers 90 are formed on one side of the first substrate 10, where the multiple primary spacer assemblies 80 each include a first primary spacer 81, a second primary spacer 82, and a piezoelectric element 85. The first primary spacer 81 is adjacent to the second primary spacer 82, and the first primary spacer 81 and the second primary spacer 82 are each connected to the first substrate 10. Two opposite ends of the piezoelectric element 85 are connected to the first primary spacer 81 and the second primary spacer 82, respectively.

At S30, a second substrate 20 is provided, and the first substrate 10 and the second substrate 20 are cell-aligned to form the display panel 100, where the first primary spacer 81, the second primary spacer 82, and the multiple secondary spacers 90 are between the first substrate 10 and the second substrate 20.

In an implementation, before the first substrate 10 and the second substrate 20 are cell-aligned, a first alignment layer 40 is formed on one side of the first substrate 10 on which the multiple primary spacer assemblies 80 are formed, and a second alignment layer 50 is formed on one side of the second substrate 20 where pixel electrodes are disposed. After the first alignment layer 40 and the second alignment layer 50 are formed, a liquid crystal dropping process is performed, and then the first substrate 10 and the second substrate 20 are cell-aligned.

It can be understood that, the first substrate 10 and the second substrate 20 being cell-aligned refers to a process of aligning the first substrate 10 and the second substrate 20 in a vacuum environment and bonding the first substrate 10 and the second substrate 20 together by sealant.

Figure 9:
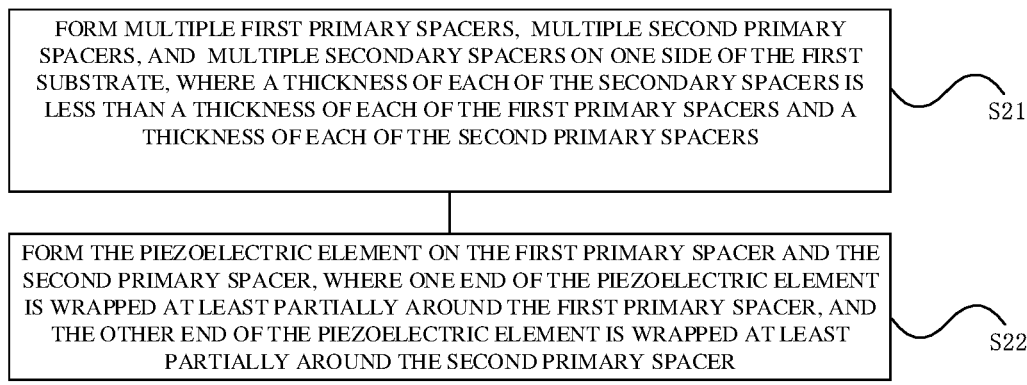
FIG. 9 is a first flowchart of operations at S20 in the method for manufacturing the display panel as illustrated in FIG. 8.

Please refer to FIG. 9, which is a first flowchart of operations at S20 in the method for manufacturing the display panel as illustrated in FIG. 8, for forming the display panel 100. Operations at S20 may include at least the following.

At S21, multiple first primary spacers 81, multiple second primary spacers 82, and multiple secondary spacers 90 are formed on one side of the first substrate 10, where the thicknesses of each of the multiple secondary spacers 90 is less than the thickness of each of the multiple first primary spacers 81 and a thickness of each of the multiple second primary spacers 82.

In an implementation, the multiple first primary spacers 81, the multiple second primary spacers 82, and the multiple secondary spacers 90 may be formed through a process including coating a photoresist material, exposing with a mask, developing, and drying, or formed through 3D printing. The first primary spacer 81 and the second primary spacer 82, as a whole, are spaced apart from the secondary spacer 90.

S22, the piezoelectric element 85 is formed on the first primary spacer 81 and the second primary spacer 82, where one end of the piezoelectric element 85 is wrapped at least partially around the first primary spacer 81, and the other end of the piezoelectric element 85 is wrapped at least partially around the second primary spacer 82, respectively.

In an implementation, the piezoelectric element 85 may be formed through a process including coating a photoresist material, exposing with a mask, developing, and drying, or formed through 3D printing. "Partially around" may refer to around a quarter of a periphery, around a half of a periphery, around two thirds of a periphery, around three quarters of a periphery, or the like, which is not specifically limited in the present disclosure.

Please refer to FIG. 10, which is a second flowchart of operations at S20 in the method for manufacturing the display panel as illustrated in FIG. 8, for forming the display panel 200. Operations at S20 may at least include the following.

At S20a, multiple first columns 811, multiple second columns 821, and multiple secondary spacers 90 are formed on one side of the first substrate 10. The multiple first columns 811 each are adjacent to a second column 821, the multiple first columns 811 each define a first groove 81a on one side of the first column 811 facing the second column 821 and define a second groove 81b at a bottom of the first groove 81a, the multiple second columns 821 each define a third groove 82a on one side of the second column 821 facing the first column 811 and define a fourth groove 82b at the bottom of the third groove 82a.

Figure 12:
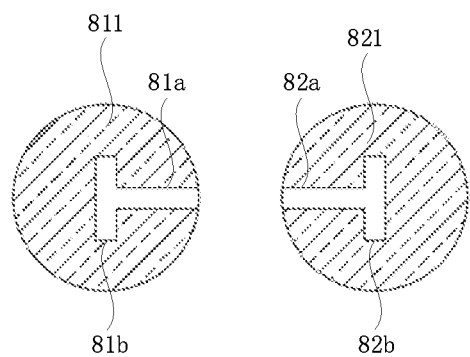
FIG. 12 is a schematic structural top view of a first column and a second column as illustrated in FIG. 11.

In an implementation, please refer to FIGS. 11 and 12 together, where FIG. 11 is a schematic diagram of a structure formed through operations at S20a in the method for manufacturing a display panel provided as illustrated in FIG. 8, and FIG. 12 is a schematic structural top view of the first column and the second column as illustrated in FIG. 11. The first columns 811, the second columns 821, and the secondary spacers 90 can be formed by coating a photoresist material, exposing with a mask, developing, and drying, etc., and the first grooves 81a, the second grooves 81b, the third grooves 82a, and the fourth grooves 82b each can be defined by etching process. Optionally, the first column 811 with the first groove 81a and the second groove 81b, the second column 821 with the third groove 82a and the fourth groove 82b, and the secondary spacer 90 each can be formed through 3D printing.

In an implementation, the first groove 81a and the second groove 81b each extend to a surface of the first column 811 away from the first substrate 10, and the third groove 82a and the fourth groove 82b extend to a surface of the second column 821 away from the first substrate 10.

At S20b, a first fixing element 87 is formed in the second groove 81b, and a second fixing element 88 is formed in the fourth groove 82b, the piezoelectric element 85 is formed between the first fixing element 87 and the second fixing element 88, one end of the piezoelectric element 85 is connected to the first fixing element 87 and disposed in the first groove 81a, and the other end of the piezoelectric element 85 is connected to the second fixing element 88 and disposed in the third groove 82a.

In an implementation, the first fixing element 87, the second fixing element 88, and the piezoelectric element 85 may be formed through a process including coating a photoresist material, exposing with a mask, developing, and drying, or formed through 3D printing.

In an implementation, the first fixing element 87, the second fixing element 88, and the piezoelectric element 85 may be integrally molded.

At S20c, a third column 812 is formed on one side of the first column 811 away from the first substrate 10 and a fourth column 822 is formed on one side of the second column 821 away from the first substrate 10, where the first column 811 and the third column 812 form the first primary spacer 81, and the second column 821 and the fourth column 822 form the second primary spacer 82.

In an implementation, the third column 812 and the fourth column 822 may be formed through a process including coating a photoresist material, exposing with a mask, developing, and drying, or formed through 3D printing.

Figure 13:
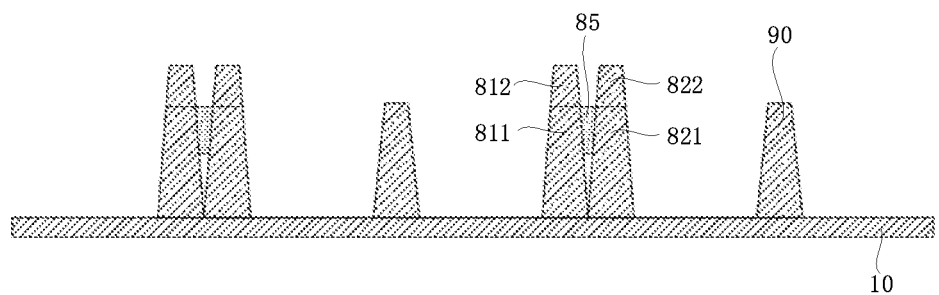
FIG. 13 is a schematic diagram of a structure formed through operations at S20c in the method for manufacturing the display panel as illustrated in FIG. 8.

In an implementation, please refer to FIG. 13, which is a schematic diagram of a structure formed through operations at S20c as illustrated in FIG. 8. The third column 812 is formed on one side of the first column 811 away from the first substrate 10 so as to form the first primary spacer 81, and the fourth column 822 is formed on one side of the second column 821 away from the first substrate 10 so as to form the second primary spacer 82. A surface of the third column 812 facing the first column 811 and a surface of the first column 811 facing the third column 812 are flush with each other and have the same size, and a surface of the fourth column 822 facing the second column 821 and a surface of the second column 821 facing the fourth column 822 are flush with each other and have the same size.

In summary, the method for manufacturing the display panel provided in implementations of the present disclosure includes the following. The first substrate 10 is provided, and multiple primary spacer assemblies 80 are formed on one side of the first substrate 10. Each of the multiple primary spacer assemblies 80 includes the first primary spacer 81, the second primary spacer 82, and the piezoelectric element 85. The first primary spacer 81 and the second primary spacer 82 are adjacent to each other and each are connected to the first substrate 10. Two opposite ends of the piezoelectric element 85 are connected to the first primary spacer 81 and the second primary spacer 82, respectively. A second substrate 20 is provided, and the first substrate 10 and the second substrate 20 are cell-aligned to form the display panel 100, where the first primary spacer 81 and the second primary spacer 82 are between the first substrate 10 and the second substrate 20. The piezoelectric element 85 is configured to be deformed after the first primary spacer 81 and the second primary spacer 82 are deformed and/or deflected, so as to generate a compensation electric field, and the compensation electric field is configured to reduce an intensity of a preset electric field for driving the liquid crystal molecules 61 to deflect. Therefore, when the display panel 100 is scratched, the compensation electric field that reduces the preset electric field is formed in the scratched region to compensate for the difference between pre-tilt angles of the liquid crystal molecules 61 in the scratched region and pre-tilt angles of the liquid crystal molecules 61 in other display regions, thereby preventing trace mura in the scratched region. Furthermore, the compensation electric field does not reduce the transmittance of the display panel 100, thereby improving the visual experience of the user.

The flow chart illustrated in the present disclosure is merely an implementation, and there may be various modifications and changes of the steps in the figures or the present disclosure without departing from the spirit of the present disclosure. For example, the steps may be performed in different orders, or certain steps can be added, deleted, or modified. Those of ordinary skill in the field can understand and realize all or a part of the process of the above implementations, and the equivalent changes made in accordance with the claims of the present disclosure still belong to the scope of the present disclosure covered.

The reference term "an implementation", "some implementations", "an exemplary implementation", "an embodiment", "a specific embodiment", or "some embodiments" referred to herein means that a particular feature, structure, material, or characteristic described in conjunction with implementations or embodiments may be contained in at least one implementation or embodiment of the present disclosure. The exemplary expressions of the above terms appearing in the specification does not necessarily refer to the same implementation or embodiment. Furthermore, the particular feature, structure, material, or characteristic described may be properly combined in any one or more implementations or embodiments.

It should be understood that the application of the present disclosure is not limited to the above examples, and for those of ordinary skill in the art, improvements or modifications can be made according to the above descriptions, and all such improvements and modifications shall fall within the protection scope of the appended claims of the present disclosure. Those of ordinary skill in the art can understand all or part of methods for implementing the above implementations, and equivalent changes made according to the claims of the present disclosure still fall within the scope of the present disclosure.

What is claimed is:

1. A display panel comprising a first substrate, a second substrate opposite to the first substrate, and a liquid crystal layer between the first substrate and the second substrate, the liquid crystal layer comprising a plurality of liquid crystal molecules, wherein the display panel further comprises a plurality of primary spacer assemblies, and each of the plurality of primary spacer assemblies comprises:
   a first primary spacer and a second primary spacer adjacent to the first primary spacer, wherein one end of the first primary spacer is connected to the first substrate, the other end of the first primary spacer is in contact with the second substrate, one end of the second primary spacer is connected to the first substrate, and the other end of the second primary spacer is in contact with the second substrate; and
   a piezoelectric element, wherein one end of the piezoelectric element is in contact with and connected to the first primary spacer, and the other end of the piezoelectric element is in contact with and connected to the second primary spacer; and when the first primary spacer and the second primary spacer are deformed and/or deflected, the piezoelectric element is deformed to generate a compensation electric field, and the compensation electric field is used to reduce an intensity of a preset electric field for driving the liquid crystal molecules to deflect.

2. The display panel according to claim 1, wherein one end of the piezoelectric element is wrapped at least partially around the first primary spacer, and the other end of the piezoelectric element is wrapped at least partially around the second primary spacer.

3. The display panel according to claim 1, wherein the first primary spacer defines a first groove at one side of the first primary spacer facing the second primary spacer and defines a second groove at a bottom of the first groove, and the second primary spacer defines a third groove at one side of the second primary spacer facing the first primary spacer and defines a fourth groove at a bottom of the third groove; and
   each of the plurality of primary spacer assemblies further comprises a first fixing element and a second fixing element, the first fixing element is accommodated in the second groove, the second fixing element is accommodated in the fourth groove, one end of the piezoelectric element is accommodated in the first groove and connected to the first fixing element, and the other end of the piezoelectric element is accommodated in the third groove and connected to the second fixing element.

4. The display panel according to claim 3, wherein a width of the second groove is greater than a width of the first groove, and/or a length of the second groove is greater than a length of the first groove; and wherein
   a width of the fourth groove is greater than a width of the third groove, and/or a length of the fourth groove is greater than a length of the third groove.

5. The display panel according to claim 1, wherein an angle between an electric-field direction of the compensation electric field and an electric-field direction of the preset electric field is greater than 90° and less than or equal to 180°.

6. The display panel according to claim 1, wherein a thickness of the first primary spacer ranges from 2 μm to 6 μm, and a thickness of the second primary spacer ranges from 2 μm to 6 μm;
   a distance between an end of the first primary spacer close to the first substrate and an end of the second primary spacer close to the first substrate ranges from 0 μm to 1 μm; and
   a distance between an end of the first primary spacer close to the second substrate and an end of the second primary spacer close to the second substrate ranges from 1 μm to 10 μm.

7. A display device, comprising a backlight module and a display panel, wherein the display panel is disposed at a light-emitting side of the backlight module; wherein the display panel comprises a first substrate, a second substrate opposite to the first substrate, and a liquid crystal layer between the first substrate and the second substrate, the liquid crystal layer comprises a plurality of liquid crystal molecules, the display panel further comprises a plurality of primary spacer assemblies, and each of the plurality of primary spacer assemblies comprises:
   a first primary spacer and a second primary spacer adjacent to the first primary spacer, wherein one end of the first primary spacer is connected to the first substrate, the other end of the first primary spacer is in contact with the second substrate, one end of the second primary spacer is connected to the first substrate, and the other end of the second primary spacer is in contact with the second substrate; and
   a piezoelectric element, wherein one end of the piezoelectric element is in contact with and connected to the first primary spacer, and the other end of the piezoelectric element is in contact with and connected to the second primary spacer; and when the first primary spacer and the second primary spacer are deformed and/or deflected, the piezoelectric element is deformed to generate a compensation electric field, and the compensation electric field is used to reduce an intensity of a preset electric field for driving the liquid crystal molecules to deflect.

8. The display device according to claim 7, wherein one end of the piezoelectric element is wrapped at least partially around the first primary spacer, and the other end of the piezoelectric element is wrapped at least partially around the second primary spacer.

9. The display device according to claim 7, wherein the first primary spacer defines a first groove at one side of the first primary spacer facing the second primary spacer and defines a second groove at a bottom of the first groove, and the second primary spacer defines a third groove at one side of the second primary spacer facing the first primary spacer and defines a fourth groove at a bottom of the third groove; and each of the plurality of primary spacer assemblies further comprises a first fixing element and a second fixing element, the first fixing element is accommodated in the second groove, the second fixing element is accommodated in the fourth groove, one end of the piezoelectric element is accommodated in the first groove and connected to the first fixing element, and the other end of the piezoelectric element is accommodated in the third groove and connected to the second fixing element.

10. The display device according to claim 9, wherein a width of the second groove is greater than a width of the first groove, and/or a length of the second groove is greater than a length of the first groove; and wherein a width of the fourth groove is greater than a width of the third groove, and/or a length of the fourth groove is greater than a length of the third groove.

11. The display device according to claim 7, wherein an angle between an electric-field direction of the compensation electric field and an electric-field direction of the preset electric field is greater than 90° and less than or equal to 180°.

12. The display device according to claim 7, wherein a thickness of the first primary spacer ranges from 2 μm to 6 μm, and a thickness of the second primary spacer ranges from 2 μm to 6 μm;

a distance between an end of the first primary spacer close to the first substrate and an end of the second primary spacer close to the first substrate ranges from 0 μm to 1 μm; and a distance between an end of the first primary spacer close to the second substrate and an end of the second primary spacer close to the second substrate ranges from 1 μm to 10 μm.

13. A method for manufacturing a display panel, for manufacturing the display panel according to claim 1 and comprising:

providing a first substrate;

forming a plurality of primary spacer assemblies and a plurality of secondary spacers on one side of the first substrate, wherein each of the plurality of primary spacer assemblies comprises a first primary spacer, a second primary spacer, and a piezoelectric element, the first primary spacer and the second primary spacer are adjacent to each other and are connected to the first substrate, one end of the piezoelectric element is in contact with and connected to the first primary spacer, and the other end of the piezoelectric element is in contact with and connected to the second primary spacer; and providing a second substrate, and cell-aligning the first substrate and the second substrate to form the display panel, wherein the first primary spacer, the second primary spacer, and the plurality of secondary spacers are between the first substrate and the second substrate.

14. The method for manufacturing the display panel according to claim 13, wherein forming the plurality of primary spacer assemblies and the plurality of secondary spacers on one side of the first substrate comprises:

forming a plurality of first primary spacers, a plurality of second primary spacers, and the plurality of secondary spacers on said one side of the first substrate, wherein a thickness of each of the secondary spacers is less than a thickness of each of the first primary spacers and a thickness of each of the second primary spacers; and forming the piezoelectric element on the first primary spacer and the second primary spacer, wherein one end of the piezoelectric element is wrapped at least partially around the first primary spacer, and the other end of the piezoelectric element is wrapped at least partially around the second primary spacer.

15. The method for manufacturing the display panel according to claim 13, wherein forming the plurality of primary spacer assemblies and the plurality of secondary spacers on one side of the first substrate comprises:

forming a plurality of first columns, a plurality of second columns, and the plurality of secondary spacers on said one side of the first substrate, wherein the plurality of first columns each are adjacent to a second column, the plurality of first columns each define a first groove on one side of the first column facing the second column and define a second groove at a bottom of the first groove, and the plurality of second columns each define a third groove on one side of the second column facing the first column and define a fourth groove at a bottom of the third groove;

forming a first fixing element in the second groove and a second fixing element in the fourth groove, and forming the piezoelectric element between the first fixing element and the second fixing element, wherein one end of the piezoelectric element is connected to the first fixing element and in the first groove, and the other end of the piezoelectric element is connected to the second fixing element and in the third groove; and forming a third column on one side of the first column away from the first substrate, and forming a fourth column on one side of the second column away from the first substrate, wherein the first column and the third column form the first primary spacer, and the second column and the fourth column form the second primary spacer.

\* \* \* \* \*